US007664780B1

(12) United States Patent  
Beachy et al.

(10) Patent No.: US 7,664,780 B1  
(45) Date of Patent: Feb. 16, 2010

(54) PROCESS DATA DEVELOPMENT AND ANALYSIS SYSTEM AND METHOD

(75) Inventors: Keith Beachy, Plain City, OH (US); William Douglas Brake, Marysville, OH (US); Peter Parks, Cable, OH (US); Tonya Russell, Marysville, OH (US)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 942 days.

(21) Appl. No.: 11/345,791

(22) Filed: Feb. 2, 2006

Related U.S. Application Data

(63) Continuation of application No. 10/288,409, filed on Nov. 4, 2002, now abandoned.

(51) Int. Cl.  
*G06F 17/30* (2006.01)

(52) U.S. Cl. .................................. 707/104.1; 707/100

(58) Field of Classification Search ............... 707/100, 707/104.1  
See application file for complete search history.

(56) References Cited

U.S. PATENT DOCUMENTS

| | | | |
|---|---|---|---|
| 4,583,280 A | 4/1986 | Corrigan et al. ............... 29/563 |
| 4,780,907 A | 10/1988 | Spieser et al. ................... 382/6 |
| 5,365,603 A | 11/1994 | Karmann ...................... 382/48 |
| 5,463,555 A | 10/1995 | Ward et al. ................... 364/468 |
| 5,551,028 A * | 8/1996 | Voll et al. ................ 707/103 R |
| 5,566,327 A * | 10/1996 | Sehr ........................ 707/104.1 |
| 5,646,862 A | 7/1997 | Jolliffe et al. ................ 364/488 |
| 5,680,615 A * | 10/1997 | Marlin et al. ............ 707/103 R |
| 5,706,213 A | 1/1998 | Takakura et al. ............. 364/552 |
| 5,778,381 A * | 7/1998 | Sandifer ................... 707/104.1 |
| 5,822,207 A | 10/1998 | Hazama et al. ......... 364/468.03 |
| 5,838,563 A | 11/1998 | Dove et al. ................... 364/188 |
| 5,895,462 A * | 4/1999 | Toki ............................... 707/3 |
| 5,907,490 A | 5/1999 | Oliver .................... 364/468.05 |
| 5,987,474 A * | 11/1999 | Sandifer ................... 707/104.1 |
| 6,018,716 A | 1/2000 | Denardo et al. ................. 705/7 |
| 6,108,662 A | 8/2000 | Hoskins et al. .............. 707/102 |

(Continued)

OTHER PUBLICATIONS

H.B. Maynard and Company, Inc., Maynard Software Products advertising literature, Pittsburgh, PA, 2 pages (May 20, 2002).

(Continued)

*Primary Examiner*—Don Wong  
*Assistant Examiner*—Kim T Nguyen  
(74) *Attorney, Agent, or Firm*—Standley Law Group LLP

(57) ABSTRACT

A process data development and analysis system and method is disclosed. In an example embodiment, the system and method are implemented as a web-based tool that supports varied activities for defining and managing all aspects of production line processes used in a manufacturing environment. Software modules provide features and functionality for process and unit management as well as administration and report generation. Manufacturing processes comprise a plurality of units of operation, and a unit of operation comprises one or more working point details (i.e., tasks). Times are associated with each unit of operation so that the manufacturer may understand and analyze the amount of time required to complete the processes and manufacture the product. The process and unit data may be used to create operation standards for use by associates working on the production line. Report generation features allow a user to produce a variety of reports associated with the processes and units of operation.

20 Claims, 19 Drawing Sheets

U.S. PATENT DOCUMENTS

| | | | |
|---|---|---|---|
| 6,141,647 A | 10/2000 | Meijer et al. | 705/1 |
| 6,169,987 B1 * | 1/2001 | Knoblock et al. | 707/10 |
| 6,292,806 B1 * | 9/2001 | Sandifer | 707/104.1 |
| 6,345,259 B1 | 2/2002 | Sandoval | 705/7 |
| 6,459,949 B1 | 10/2002 | Black et al. | 700/121 |
| 2001/0020254 A1 * | 9/2001 | Blumenau et al. | 709/229 |
| 2001/0029508 A1 * | 10/2001 | Okada et al. | 707/104.1 |
| 2001/0053940 A1 | 12/2001 | Horn et al. | 700/32 |
| 2002/0026537 A1 * | 2/2002 | Schlabach et al. | 710/1 |
| 2002/0040309 A1 | 4/2002 | Powers et al. | 705/7 |
| 2002/0046214 A1 * | 4/2002 | Sandifer | 707/104.1 |
| 2002/0087578 A1 * | 7/2002 | Vroman | 707/104.1 |
| 2002/0147518 A1 | 10/2002 | Nguyen | 700/108 |

OTHER PUBLICATIONS

Jong-Yeol Kang, "The Production System of Korean Automobile Industry", Massachusetts Institute of Technology, http://imvp.mit.edu/papers/98/192a.pdf, pp. 1-12, 1997.

Jozef Kristak, "Work analysis and time measurement in advanced manufacturing systems", IPA Slovakia, 5 pages (undated).

Peak Performance Technologies, Inc., Peak biomechanics advertising literature, 5 pages (2001).

Saab 9-3: Specs and features for the 2000 Saab 9-3, CarsDirect.com., printed Apr. 16, 2005, pp. 1-3 (2000).

* cited by examiner

Admin    Process Management    Unit Management    Manpower Scenarios    Generate Reports    Queries Model Year: 2003    Production Rate: 475    Line Number: 3    VMC: B ▦ Process Management – View Process by Team By Team  150 ⸺ Go to Team: [D-1 ▽] ⸺ 158
By Zone
By Sub-Zone    ▦ Team D-1

| Process No. | Process Name | Body Loc |
|---|---|---|
| 3B076 | CLUSTER PIPE SUB #1 | 000L |
| 3B077 | CLUSTER PIPE SUB #2 | 000L |
| 3B108 | ABS MODULATOR SUB #1 | 000L |
| 3B114 | ABS MODULATOR SUB #2 | 000L |
| 3B807 | RIGHT UPPER LOCK INSTALL | 001R |
| 3B814 | RIGHT LOWER LOCK INSTALL | 002R |
| 3B803 | RIGHT FRONT DOOR HARNESS | 003R |
| 3B812 | RIGHT FRONT OUTER HANDLE | 004R |
| 3B810 | RIGHT REAR WIRE HARNESS | 004R |
| 3B817 | RIGHT FRONT DOOR LOCK | 005R |
| 3B831 | RIGHT FRONT RUNCHANNEL | 006R |
| 3B809 | RIGHT REAR OPEN SEAL INSTALL | 007R |
| 3B015 | RIGHT SYNCHRONIZER | 008R |
| 3B815 | RIGHT DOOR LOCK TIGHTEN | 008R |
| 3B816 | RIGHT SHOULDER SLIDE INSTALL | 009R |
| 3B818 | RIGHT REAR GLASS INSTALL | 010R |

152 points to Process No. column; 154 points to Process Name; 156 points to Body Loc; 160 points to 3B831.

FROM FIG-4A

◫ Team D-2

| Process No. | Process Name | Body Loc |
|---|---|---|
| 3B524 | R DRIVE SHAFT SUB | 000R |
| 3B527 | L DRIVE SHAFT SUB | 000R |
| 3B528 | DRIVESHAFT SUB ASSY LOAD | 000R |
| 3B858 | LEFT UPPER LOCK INSTALL | 001L |
| 3B860 | LEFT LOWER LOCK INSTALL | 002L |
| 3B850 | LEFT FRONT DOOR HARNESS | 003L |
| 3B851 | LEFT FRONT OUTER HANDLE | 004L |
| 3B857 | LEFT REAR WIRE HARNESS | 004L |
| 3B859 | LEFT FRONT DOOR LOCK | 005L |
| 3B853 | LEFT FRONT RUNCHANNEL | 006L |
| 3B856 | LEFT REAR OPEN SEAL INSTALL | 007L |
| 3B885 | LEFT SYNCHRONIZER INSTALL | 008L |
| 3B862 | LEFT DOOR LOCK TIGHTEN | 008L |
| 3B863 | LEFT SHOULDER SLIDE INSTALL | 009L |

FIG-4B

Admin  Process Management  Unit Management  Manpower Scenarios  Generate Reports  Queries Model Year: 2003  Production Rate: 475  Line Number: 3  VMC: B Process Management – View Process: 3B831                                178 ──[ Edit ] [ Delete ]

▣ Process No.: 3B831          Process Name: RIGHT FRONT RUNCHANNEL

170 ── Process Details:  Zone: SD         Sub-Zone: DSR
       172 ── Team: D-1   Body/Line Loc: 006R

| Seq | Unit No. | Unit of Oper. | Unit Time | Base Part No. | Create |
|---|---|---|---|---|---|
| 1 | B03402 | APPLY SOAP TO LEFT FRONT RUNCHANNEL | 4.0 | 72235 | 01/01/1992 |
| 2 | B03403 | SET RUNCHANNEL TO TOP SECTION OF RIGHT FRONT DOOR SASH | 16.6 | 72235 | 01/01/1988 |
| 3 | B03404 | SET CENTER SASH SECTION OF RUNCHANNEL TO RIGHT FRONT DOOR SASH | 8.3 | 72235 | 01/01/1988 |
| 4 | B03399 | SET RUNCHANNEL TO LOWER SECTION OF CENTER SASH ON LEFT FRONT DOOR | 5.8 | 72235 | 01/01/2001 |
| 5 | B03413 | SET RUNCHANNEL TO FRONT LOWER SASH OF RIGHT FRONT DOOR | 9.4 | 72235 | 01/01/1999 |

180 ──[ Add New Unit ]

▣ Process Time by Model Type
174 ──

| Model Type: | Total Time: |
|---|---|
| XX1 | 44.1 |
| XX2 | 44.1 |
| XX3 | 44.1 |
| XX4 | 44.1 |
| XX1 | 44.1 |
| ZZZ | |

Model: [ XY1 ▽ ]
176 ──

Print Process Sheet: ── 182
[ With Times ]  [ Without Times ]

▣ Features

[ Return to View Process By Team ]

FIG-5

Admin   Process Management   Unit Management   Manpower Scenarios   Generate Reports   Queries Model Year: 2003   Production Rate: 475   Line Number: 3   VMC: B Unit Management – View Unit: B03403

Unit No.: B03403   Process No.: 3B831   Process Name: RIGHT FRONT RUNCHANNEL   226 — [Edit]   [Delete]

210 — Team: D-1   Zone: SD   Sub-Zone: DSR   Body Loc: 006R
Unit of Oper.: SET RUNCHANNEL TO TOP SECTION OF RIGHT FRONT DOOR SASH 212 — Add/Update Image(s)   Unit Sheet Report — 214

Unit Information

116 — Base Part No.: 72235   Work Area:   Torque Val.: NONE
Auxiliary Materials:
Quality Issues:
Working Point Detail: get runchannel from kit pack and place upper rear section to fr door (top corner)
place runchannel's bottom center sash section in between door panels
set upper corner of runchannel to door (spread outer flaps to outside edges of door flange)
seat to upper corner
reget runchannel and seat to door
place runchannel's bottom front section in between door panels
seat runchannel at mirror gusset
re-get and align to corner at mirror gusset
reget runchannel and seat to door

FIG-7A   TO FIG-7B

FROM FIG-7A

Working Point: soap will make installation easier, all unrepaired items must be written on back of door sheet with X placed through front side Quality Point: make sure runchannel is smooth, check the corner of the runchannel to make sure that it is set in the proper location. make sure outer flaps are not pinched 218 — Unit Time

| Seq | Working Point Detail | Time Sequence | Freq | Int to Seq | Net Loss Code | Non Freq. TMUs | Time (sec) | Base Part No. |
|---|---|---|---|---|---|---|---|---|
| 1 | get runchannel from kit pack and place upper rear section to fr door (top corner) | A1B0G3A1B0P1A0 | 1 | 0 | N2 | 60 | 2.160 | 7223 |
| 2 | place runchannel's bottom center sash section In between door panels set upper corner of runchannel to door | A0B0G0A1B0P3A0 | 1 | 0 | N2 | 40 | 1.440 | 7223 |
| 3 | (spread outer flaps to outside edges of door flange) | A1B0G1M1X0I1A0 | 1 | 0 | N2 | 40 | 1.440 | 7223 |
| 4 | seat to upper corner | A0B0G0M3X0I0A0 | 1 | 0 | N2 | 30 | 1.080 | 7223 |
| 5 | reget runchannel and seat to door | A0B0G1M1X0I0A0 | 6 | 0 | N2 | 20 | 4.320 | 7223 |
| 6 | place runchannel's bottom front section in between door panels | A0B-G0A1B0P3A0 | 1 | 0 | N2 | 40 | 1.440 | 7223 |
| 7 | seat runchannel at miror gusset | A0B0G0M3X0I0A0 | 1 | 0 | N2 | 30 | 1.080 | 7223 |
| 8 | re-get and align to corner at mirror gusset | A1B0G1M1X0I1A0 | 1 | 0 | N2 | 40 | 1.440 | 7223 |
| 9 | reget runchannel and seat to door | A0B0G1M1X0I0A0 | 3 | 0 | N2 | 20 | 2.160 | 7223 |

Unit Time Total: 16.6

228 — Unit Time Report

FROM FIG-7B

⊞ Unit Parts ——220

| Part No.: | Part Name | Qty. | Del. Style | Del. Zone | Del. Loc | Section | Item No. | Del. Eff Date |
|---|---|---|---|---|---|---|---|---|
| 72235SVCAA010M1 | RUNCHANNEL R,FR DOOR | 1 | KIT | X | KRFD | F24 | 72235 | 01/01/2002 |

230 —— Process/Parts Summary

⊞ Unit Matrix ——222

XYZ Matrix
| XX2 | XX3 | XX4 | XX5 | XX6 | XX7 | YY1 | YY2 | YY3 |
| ZZ1 | ZZ2 | ZZ3 | ZZ4 | ZZ5 | ZZ6 | ZZ7 | YY1 | XZ1 |
| YY4 | | | | | | | | |

ZYX Matrix
| XX7 | XX6 | XX5 | XX4 | XX3 | XX2 | XX1 | YY4 | YY3 | YY2 |
| ZZ2 | ZZ2 | ZZ3 | ZZ4 | ZZ5 | ZZ6 | ZZ7 | ZZ8 | XY2 | XZ2 |
| YY1 | | | | | | | | | |

⊞ Unit Maintenance History ——224

| User Name | Date | Time | Reason for Change |
|---|---|---|---|
| MT05421 | 02/12/2002 | 08:22 | NONE |
| | | | CORRECTED BASE PART # AND SWITCH RIGHT FOR LEFT IN DESC. |
| MT05421 | 01/03/2002 | 13:03 | OFF LINE BUILD |
| | | | YZ INITIAL MOST ISSUE - COPYOVER |
| INITLOAD | 11/28/2001 | 15:39 | - |

Return to Unit Management Menu

FIG-7C

Admin    Process Management    Unit Management    Manpower Scenarios    Generate Reports    Queries

▦ Generate Reports

Operations Standards Reports —— 290

- ☐ Change History
- ☐ Line Layout
- ☐ Parts End Dated in Target
- ☐ Process Change Form
- ☐ Process/Parts Summary
- ☐ Process Sheets
- ☐ Process Sheet Summary
- ☐ Unit Sheets
- ☐ Unit Time Sheets

Manpower Justification Reports —— 292

- ☐ Change Point Documentation
- ☐ Manpower Process ID by Team
- ☐ Monthly Time Tracking
- ☐ ST by Model Types
- ☐ ST by Base Part Number
- ☐ Unit Time Tracking

SAR Reports —— 294

- ☐ Active Parts List
- ☐ Daily Changes in Parts/Process
- ☐ Delivery Change Report
- ☐ Delivery Location Range
- ☐ Discrepancy Report
- ☐ Line Delivery Changes
- ☐ Maintenance Error Report
- ☐ MBPN Conversion List
- ☐ Overage Report
- ☐ Parts not on Target
- ☐ Parts on Hold

FIG-11

Object Owner: PDADB2
Object Name: %
Include: ☑Queries ☑Forms ☑Procedures ☑Tables
Object List: 310

| Owner | Name | Type | Comment |
|---|---|---|---|
| PDADB2 | T_AF_01 | QUERY | Keyword Search-Unit Description |
| PDADB2 | T_AF_02 | QUERY | Keyword Search-Quality Point |
| PDADB2 | T_AF_03 | QUERY | Keyword Search-Working Point |
| PDADB2 | T_AF_04 | QUERY | Model Type Comparison |
| PDADB2 | T_AF_05 | QUERY | Model Type Comparison-Units |
| PDADB2 | T_AF_06 | QUERY | MTC Count for Part |
| PDADB2 | T_AF_07 | QUERY | Part Delivery by Team |
| PDADB2 | T_AF_08 | QUERY | Part Begin and End Dates |
| PDADB2 | T_AF_09 | QUERY | Parts List Sort |
| PDADB2 | T_AF_10 | QUERY | Parts per Unit |
| PDADB2 | T_AF_10F | FORM | Parts per Unit [Form] |
| PDADB2 | T_AF_11 | QUERY | Process Total Time |
| PDADB2 | T_AF_12 | QUERY | ST by Model Type |
| PDADB2 | T_AF_13 | QUERY | ST by Net Loss |
| PDADB2 | T_AF_14 | QUERY | ST by Zone and Sub-Zone |
| PDADB2 | T_AF_15 | QUERY | Too Many Parts |
| PDADB2 | T_AF_16 | QUERY | Units by Zone and Sub-Zone |
| PDADB2 | T_AF_17 | QUERY | Units with Torque Values |
| PDADB2 | T_AF_18 | QUERY | Units without Time |

312

[Refresh List]

FIG-13

Enter Substitution Variable Values

| Name | Value |
|---|---|
| &MODEL_YEAR | 2003 |
| &PROD_RATE | 450 |
| &LINE_NO | "1" |
| &VMC | "1" |
| &PART_NO_LIKE | "9000%" |

Ok

Cancel

Note: Character values MUST be in quotation marks.

FIG-14

PROCESS DATA DEVELOPMENT AND ANALYSIS SYSTEM AND METHOD

CROSS REFERENCES TO RELATED APPLICATIONS

This application is a continuation of U.S. application Ser. No. 10/288,409, filed Nov. 4, 2002, now abandoned entitled PROCESS DATA DEVELOPMENT AND ANALYSIS SYSTEM AND METHOD, which is expressly incorporated herein by reference.

FIELD OF THE INVENTION

The present invention relates to systems and methods for data collection and analysis in a manufacturing environment. In particular, the present invention relates to systems and methods for collection and analysis of data related to production line processes for a manufactured product such as an automobile and for development of new production line processes.

BACKGROUND OF THE INVENTION

In many manufacturing environments, teams of associates on a production line perform a series of operations in order to install a single component on a manufactured product. Each operation may further involve a series of tasks. The series of operations define a process that the associates follow to complete the installation. In a manufacturing environment such as an automotive assembly plant, 30-40 teams of associates may work on the production line. Each team may perform 10-12 processes where each process involves 5-10 operations and each operation involves another 5-10 tasks. The various manufacturing processes that comprise different series of operations are often developed by other associates who study and analyze data from a variety of sources when creating a new process for use on the production line.

Creation of a process often involves the following activities. First, the associate studies the component to be installed on the manufactured product. Next, the associate describes the series of operations and related tasks that comprise the installation process. Times are typically assigned to each of the tasks that comprise the operation. For tasks that are common to many operations (and therefore, the installation of many components), the times associated with the tasks may be obtained from a database of task completion times. For a task that has not been defined previously, the associate may need to study individuals performing the task and determine an appropriate time to be assigned to the task. In developing a process, the associate may be required to confirm part data such as part numbers for the component and delivery points on the production line for the necessary parts. The associate also determines which manufactured products use the defined process. The associate may further define an operation standard for use by production line associates who will be responsible for installation of the component on the manufactured product. The operation standard may include a brief description of the process, a units of operation description that explains the individual tasks required to complete the process, descriptions of the safety and quality issues involved in installation of the component, and a description of problems that may be encountered when installing the component. The operation standard may also include pictures and drawings for the production line associate to review while training on a process. Finally, the associate may create a variety of different reports related to all of the processes that have been defined.

The manufacturing processes are typically developed using a variety of software-based tools. For example, one tool may support the entry of a process description that comprises a series of operations and related tasks. A second tool may be used to create an operation standard for use by associates on the production line. A third tool may be used to verify part number data. A fourth tool may be used to obtain information about delivery points on the production line. A fifth tool may support the entry of time data and other data related to each of the tasks that define an operation. Several other tools may be used to analyze and generate reports related to all processes used on the production line.

Some of the software tools that are used may be mainframe tools while other tools are PC-based. In many instances, data from one tool must be reentered in another tool in order to complete an activity. Data reentry is a time-consuming and error-prone activity that the associates must complete in order to manage all of the manufacturing processes. As a result, development and editing of manufacturing processes is a labor-intensive activity.

Despite the labor-intensive process, different software tools are used because they allow an associate to obtain and track various data items associated with the process and allow the associate to analyze and verify certain aspects of the process before it is introduced to the production line associates. The collection and editing of data related to the processes after they have been introduced on the production line is another important activity performed by the associate. Study and analysis of the manufacturing processes allows a manufacturer to identify improvements to the processes. The process improvements may result in a number of benefits to the manufacturer including increased productivity, improved product quality, and a reduction in workplace accidents.

Systems and methods for measuring or assigning times to tasks have been created. For example, U.S. Pat. No. 4,583,280 to Corrigan discloses a method for measuring the time cycles involved in a series of manufacturing tasks. The recorded time cycles are compared with predetermined standards to identify faulty operations in the production line. Maynard Software Products has developed MOST®, a work measurement tool that supports the creation and maintenance of a database of work sub-operations using MOST® (Maynard Operation Sequence Technique). A sub-operation is a discrete, logical, and measurable part of a task. A user may create steps within a sub-operation using MOST® keyword descriptions. The software automatically produces times for each of the steps based on the MOST® parameters entered by the user. U.S. Pat. No. 4,583,280 and MOST® support systems and methods for time measurements related to tasks, but do not support all of the activities associated with process development. Therefore, there is a need for a process data development and analysis system and method that supports all activities that may be performed by an associate and that eliminates the time-consuming and error-prone activity of data reentry required by current software systems.

SUMMARY OF THE INVENTION

The present invention is a process data development and analysis system and method that supports the varied activities performed by associates who are responsible for defining and managing all aspects of production line processes used in a manufacturing environment. In an example embodiment, the present invention is implemented as a web-based tool that operates in conjunction with data obtained from a variety of sources. A plurality of software modules provide features and functionality for process and unit management as well as administration, manpower scenarios, report generation, queries, and off-line processing. Information is delivered to clients (browsers) using HTML, JavaScript, and XML/XSL. Servers provide Java Server Pages that interact with a data layer, support input from clients and display appropriate responses, handle application logic, and interface to backend services that access enterprise data. The servers interact with a database (PDDA database) comprising administration data (e.g., user data, team data, model year, production rate, selection list, and zone/sub-zone data, production line data, and vehicle model code data), process management data (e.g., process numbers, process names, product (body) locations, process descriptions, and features), unit management data (e.g., unit numbers, unit of operation descriptions, base part numbers, work area data, torque values, auxiliary materials, quality issues, working point details, working points, quality points, unit time data, and parts and application data), manpower scenario data, report generation data, and related data needed to support the web-based application of the present invention. The servers may interact with other data sources (e.g., a parts database) to validate data used in the application.

BRIEF DESCRIPTION OF THE DRAWINGS

FIGS. 4A-4B are a view process by team screen for an example embodiment of the present invention;

FIG. 5 is a view process screen for an example embodiment of the present invention;

FIGS. 7A-7C are a unit management screen for an example embodiment of the present invention;

FIG. 11 is a generate reports screen for an example embodiment of the present invention;

FIGS. 13 and 14 are query screens for an example embodiment of the present invention.

DESCRIPTION OF EXAMPLE EMBODIMENTS

Figure 1:
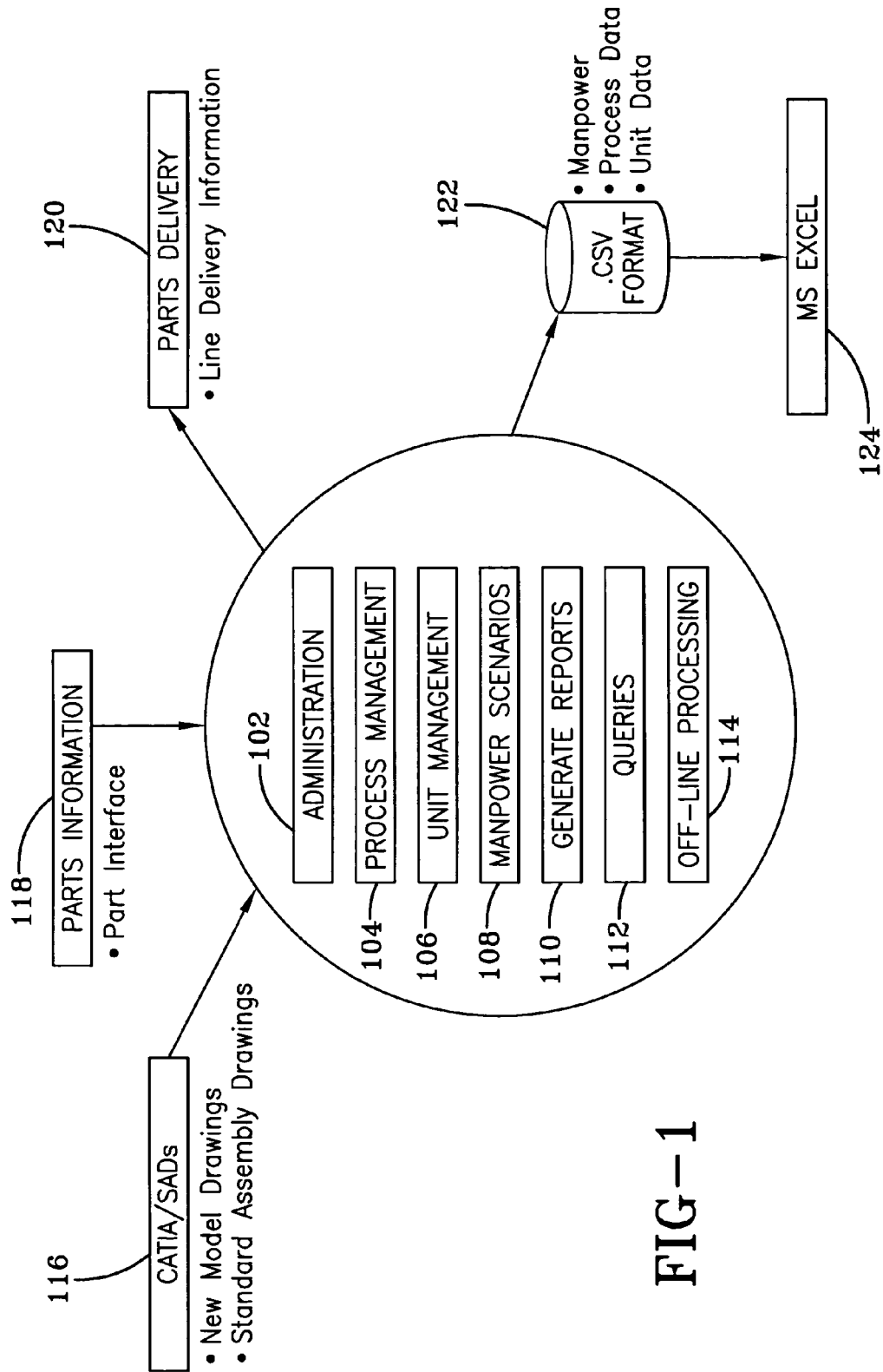
FIG. 1 is a diagram of the primary software modules for an example embodiment of the present invention.

Referring to FIG. 1, in an example embodiment of the present invention in which processes and operation standards for an automotive manufacturing environment are developed, a software application 100 comprising a plurality of software modules provide the features and functionality to support the following activities:

Administration 102;
Process Management 104;
Unit Management 106;
Manpower Scenarios 108;
Report Generation 110;
Queries 112; and
Off-Line Processing 114.

In accordance with an example embodiment of the present invention, a process comprises a plurality of units of operation (unit), and a unit of operation comprises one or more working point details (i.e., tasks). Therefore, software modules in the present invention support process management and unit management in addition to other functions. The software modules operate in conjunction to create a web-based application for process data development and analysis in which clients (browsers) and servers interact using HTML, JavaScript, and XML/XSL.

The software modules may operate in conjunction with data from other sources. For example, the software modules may operate with output from a product design application 116 such as the CATIA product design application from IBM and Dassault Systemes. Drawings for new models of automobiles as well as drawings related to standard assembly for the various models of automobiles may be used by one or more software modules. Data from a parts database 118 may also be used by the software modules. Part number data and other data may be used in developing processes and units of operation in accordance with the present invention.

Output produced by the software modules includes parts delivery information 120 that indicates where parts should be delivered to the assembly line to complete assembly of the automobile according to the operation standards that are developed using the present invention. Finally, manpower data, process data, and unit data may be output in comma-separated files (CSV format) for use in spreadsheet programs such as Microsoft's Excel.

Administration Module

Figure 2:
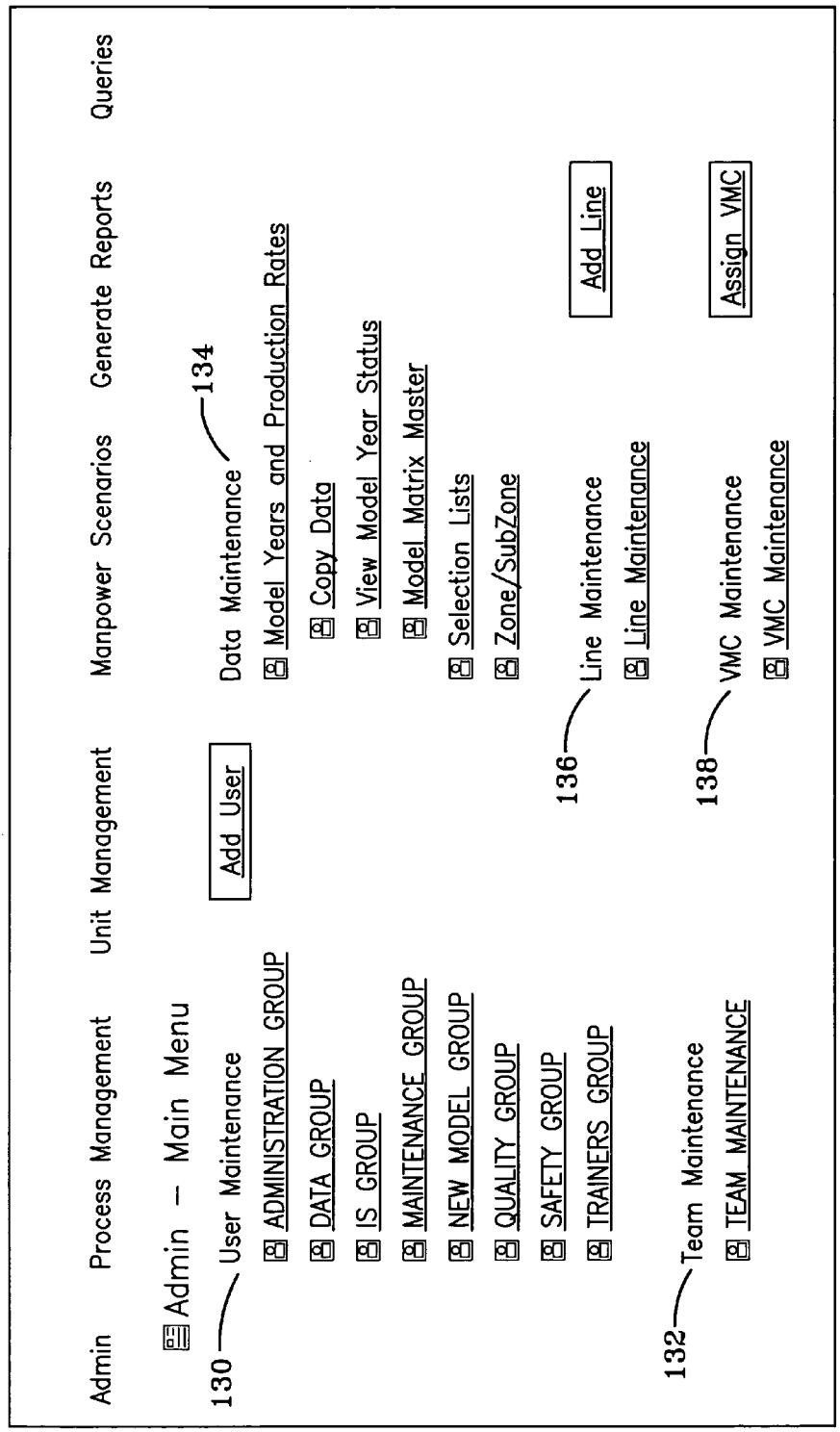
FIG. 2 is an administration main menu screen for an example embodiment of the present invention.

The administration module allows a user to administer user groups as well as data that is used to develop processes and units in accordance with the present invention. Referring to FIG. 2, an administration main menu screen for an example embodiment of the present invention is shown. A user may select from options for each of the available features as listed on the main menu. Designated administrators of the system may access the administration module of the application. In an example embodiment of the present invention for automobile manufacturing, the administration module contains options for user maintenance 130, team maintenance 132, data maintenance 134, production line maintenance 136, and vehicle model code (VMC) maintenance 138. The user maintenance option 130 allows a system administrator to define access user rights, etc. for various groups of users such as the administration group, data group, information systems group, maintenance group, new model group, quality group, safety group, and trainers group. Each group may be permitted to access and possibly edit different parts of the system.

The team maintenance option 132 allows a system administrator to add, edit, delete, and view teams by model year, production rate (e.g., number of automobiles produced per shift), production line, and vehicle model code. Production lines may be configured differently within the manufacturing environment or among the different assembly plants of the manufacturing concern. The different production lines may also be configured differently based on model year of the product being manufactured or based on production rates. Team definitions may be modified to accommodate the differences in the manufacturing scenarios based on model year, production rates, etc.

With the data maintenance option 134, a system administrator may access functions for maintaining model years and production rates, selection lists (i.e., the options that are presented to users on other screens), and zones/subzones. With the model year and production rate option, an administrator may add, edit, delete, and view data related to product model years and production rates. The administrator may establish begin and end dates (i.e., dates the system will start and stop using all data associated with a specific model year and production rate), propagation (i.e., whether changes to units are copied over to a future model year or the same model year and a different production rate), parts data validation (i.e., whether the part data that is entered is validated with data from other sources), and designating a new or current model year. The administrator may also designate a model year/production rate to be visible in drop-down selection lists.

The data maintenance option 134 allows maintenance of data related to the manufactured product such as model year, production rate, and model type data. Data maintenance may be required because different processes may be required for different model years and model types as well as for different production rates and production lines. Processes may be developed to accommodate a variety of manufacturing scenarios that may change from day-to-day.

The data maintenance option further provides the ability to copy manufactured product data, view model year status information, and edit model matrix master data to assist associates in developing and modifying processes and units. The model matrix indicates which processes and units apply to various product models that may be manufactured. The copy data option allows an administrator to perform either a complete model year copy over of unit data or a copy over at the model type level (referred to as copy and create correlations). The view model year status allows an administrator to monitor the progress of any copy function during and after execution. It provides a history of all copy functions that have been initiated by an administrator.

The model matrix master option is a subset of creating and maintaining model year and production rates. Once model year and production rates are established, the model matrix is updated. All model types that are valid for that model year and production rate are visible to the administrator. The administrator may turn off (uncheck) a specific model type. The model types that are activated (checked) are shown as options when adding or editing a unit under the specified model year and production rate.

With the selection lists option, the administrator has the ability to determine the content of all drop-down menus seen throughout the application that are not populated by data from another source. The administrator has the ability to add, edit, delete, and view information in a variety of menus (i.e., selection lists).

The zone and sub-zone option allows an administrator to add, edit, delete, view, and maintain zone and sub-zone relationships by model year/production rate/line/vehicle model code. Zones and sub-zones relate to areas on a production line for a manufactured product where processes are performed. In accordance with an example embodiment of the present invention for automobile manufacturing, zones may be "interior," "exterior," and "complex." Sub-zones may relate to areas within a zone. In accordance with an example embodiment of the present invention for automobile manufacturing, sub-zones may be "after tire left," "engine sub," and "trim medium left."

Figure 3:
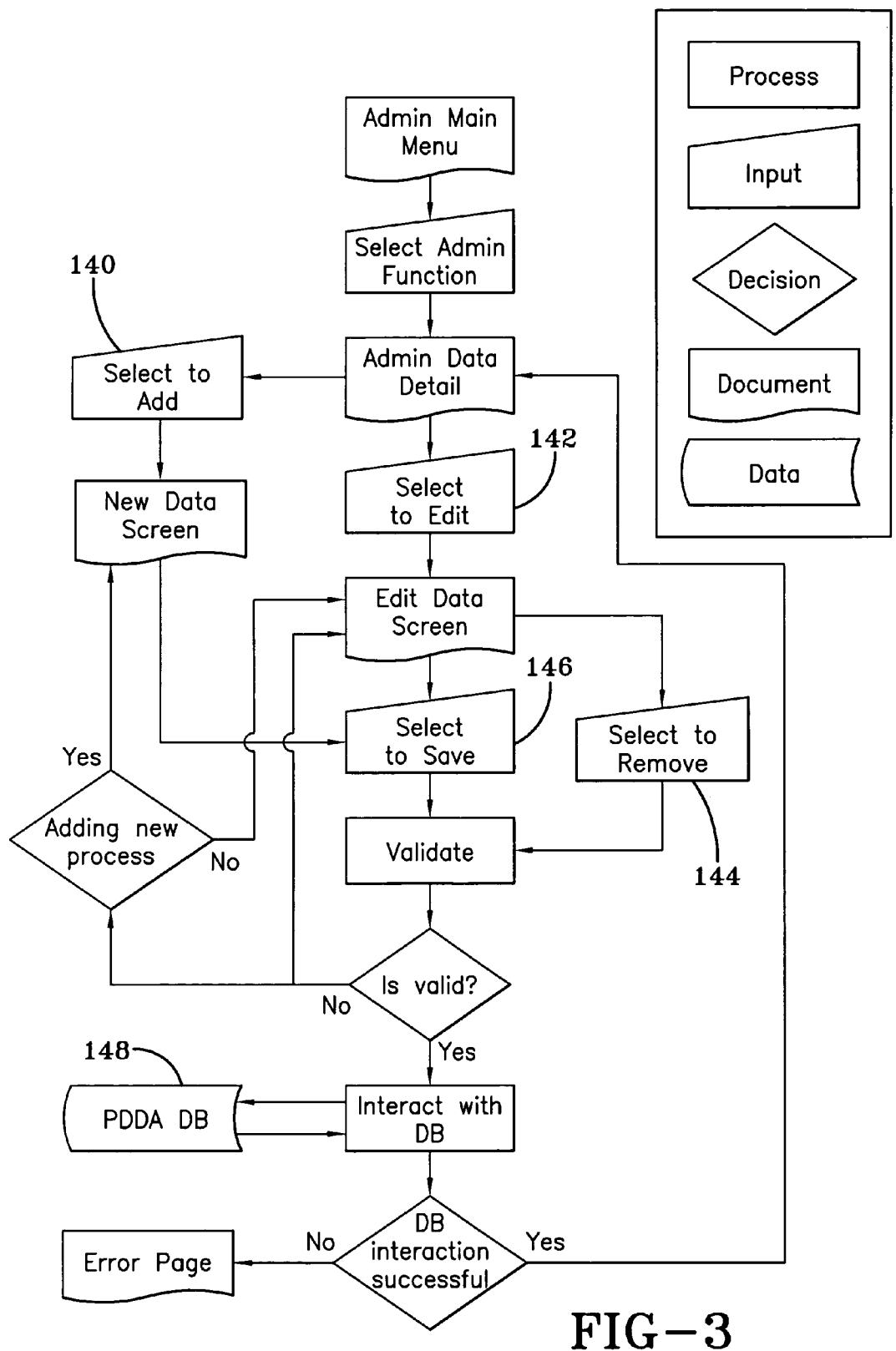
FIG. 3 is a process flow diagram for an administration module in accordance with an example embodiment of the present invention.

Referring to FIG. 3, a process flow diagram for an administration module in accordance with an example embodiment of the present invention is shown. The administration module may provide functionality for adding new administration information and data 140 as well as editing 142, removing 144, and saving 146 existing information and data. As the administrator completes various tasks, the administration module interacts with the PDDA database 148. The PDDA database 148 may comprise administration data such as user data, team data, model year, production rate, selection list, and zone/sub-zone data, production line data, and vehicle model code data.

Process Management

The process management module option allows a user to locate existing processes and view them by team, zone, or sub-zone. The user also has the ability to create new processes and to assign units of operation to that process or to edit existing units of operation within a process. To view an existing process, a user may select a preferred view (e.g., by team, zone, or sub-zone). The processes that are listed are determined by the user's selection for a model year, production rate, line number, and vehicle model code.

Drop-down menus may be populated from the administration module of the application. Each drop-down menu may list data in ascending order. The relationship between items may be hierarchical. Once the user has selected a model year, the available production rates created for that model year are shown. Once model year and production rates are selected, then production line and vehicle model code menus are populated based on the associations created and maintained through the administration module.

The three process views available to the user (by team, zone, and sub-zone) have the following common features:

Add Process—selecting the "Add Process" option takes a user to a process add screen.

View Specific Process—the process number is a link and when selected takes the user to the view process screen for the selected process. The user may view all units and features assigned to the process. The user may also add a new unit, edit or delete the process, and view process sheets.

Back to Top—selecting a "Back to Top" option takes the user to the top of the screen.

View Process by Team—this view is the default for processes. Referring to FIGS. 4A and 4B, a view process by team screen for an example embodiment of the present invention is shown. It lists the team's sequence number 150 and shows process number (by ascending body location order) 152, process name 154, and body (or product) location 156. The user may select a specific team in the "Go to Team" selection box 158 or scroll down the list to find the desired team.

View Process by Zone—selecting a "By Zone" selection box displays the processes by zone to the user. This view shows an alphabetical listing of zones with process number (by ascending body location order), process name, and sub-zone. The user may select a specific Zone in a "Go to Zone" selection box or scroll down the list to find the desired zone.

View Process by Sub-zone—selecting a "By Sub-zone" selection box displays the processes by sub-zone to the user. This view shows an alphabetical listing of sub-zones with process number (by ascending body location order), process name, and zone. The user may select a specific zone in a "Go to Sub-zone" selection box or scroll down the list to find the desired zone.

Selection of the "3B831" process 160 ("Right Front Runchannel") takes the user to a view process screen to allow the user to view details about a specific process. Referring to FIG. 5, a view process by team screen for an example embodiment of the present invention is shown. The details visible to the user appear in four sections. They include process details 170 (process number, process name, zone, sub-zone, team, and body/line location); unit details 172 (unit sequence number, unit of operation number, unit description, unit time, base part number, and creation date of the unit); process time by model type 174 (model, model type, and total time); and features 176 (features that are associated with the manufactured product).

From the view process screen of FIG. 5, the user may edit or delete the process 178, add a new unit to the process 180, or view and print process sheets with and without times 182.

Edit Process 178—selecting the "Edit" option takes the user to an editable version of the view process screen. The user may change the process name, team, zone, sub-zone, body location, add new units, reorder the units within the process, and change the features. To reorder (or re-sequence) the units within the process, the user may select a unit line of data to be moved. The system highlights the data to indicate it is selected. The user may then use up or down arrows to move the unit in the desired direction.

Delete Process 178—selecting the "Delete" (or "Remove") option removes the process from the system. A process that has units assigned to it may not be deleted. The units may be unassigned from the process or re-assigned to a different process. Then, the process may be deleted.

Add New Unit 180—selecting the "Add New Unit" option takes the user to the add unit screen. The process number, process name, team, zone, and sub-zone field are populated with the current process information. Unit numbers are automatically generated by the system. When the unit is saved, the system notifies the user of the unit number.

Process Time by Model Type 174—this feature provides a cumulative total of all model and model types associated with a process. At the unit level, the user selects the model types associated with the unit. The time to perform the unit is totaled by model type and presented to the user. The user may view different models and model types by selecting a model from the drop-down menu.

Print Process Sheets 182—this feature provides process sheets report details of each unit assigned to the process. The units are listed in order by sequence number and contain the unit number, unit description, torque, unit total time, model and model types, and base part number. Included at the bottom of the report is a list of total unit times by model and model type. The model shown is the one selected in the view process screen prior to viewing the process sheets.

With Times 182—selecting the "With Times" option takes the user to a print preview of the process sheet. This report includes the information noted above and includes the total unit time per unit.

Without Times 182—selecting the "Without Times" option takes the user to a print preview of the process sheet. This report includes information noted above, but without the total unit time.

Add New Process—from any of the three view process screens (by team, zone, or sub-zone), the user may add a new process by selecting an "Add Process" option. A form is presented so the user may enter or select the following information:

Process Name: a unique name that is descriptive of the many functions that will be performed within the process.

Zone: a specific section of the production line where the process is performed. The user may enter a zone code (e.g., two-character code) or select a list option to retrieve all valid zones. The zones in the list box are associated with the model year, production rate, production line, and vehicle model code previously chosen by the user.

Sub-zone: a specific section of the assembly line where the process is performed. The user may enter a sub-zone code (e.g., three-character code) or select a list option to retrieve all valid sub-zones. The sub-zones in the list box have an established relationship with the zone chosen by the user.

Sub-Zone Variance: the variance from the targeted time within a sub-zone (e.g., the difference between line speed and the targeted speed assigned at the sub-zone level).

Team: a group of associates that perform the functions (units) within the process. The user may enter a team name (e.g., up to four characters) or select the list option to retrieve all valid teams associated with the model year, production rate, production line, and vehicle model code chosen by the user.

Body/Line Loc: a physical location on the manufacturing floor (e.g., production line). It may be an alphanumeric field. For example, it may be a four-character field that uses a "L" or "R" as the fourth character to denote left or right side of the production line or automobile.

Features—a main component on a manufactured product (e.g., automobile). The user may associate a feature with a process by checking a box next to the desired feature. The feature selections that are available are maintained in the administration module of the application and depend upon the model year and vehicle model code that the user selected.

Save—selecting a "Save" option on the add process screen saves the new process to the system. The process number is generated by the system and appears in an on-screen message to the user after a successful save.

Figure 6A:
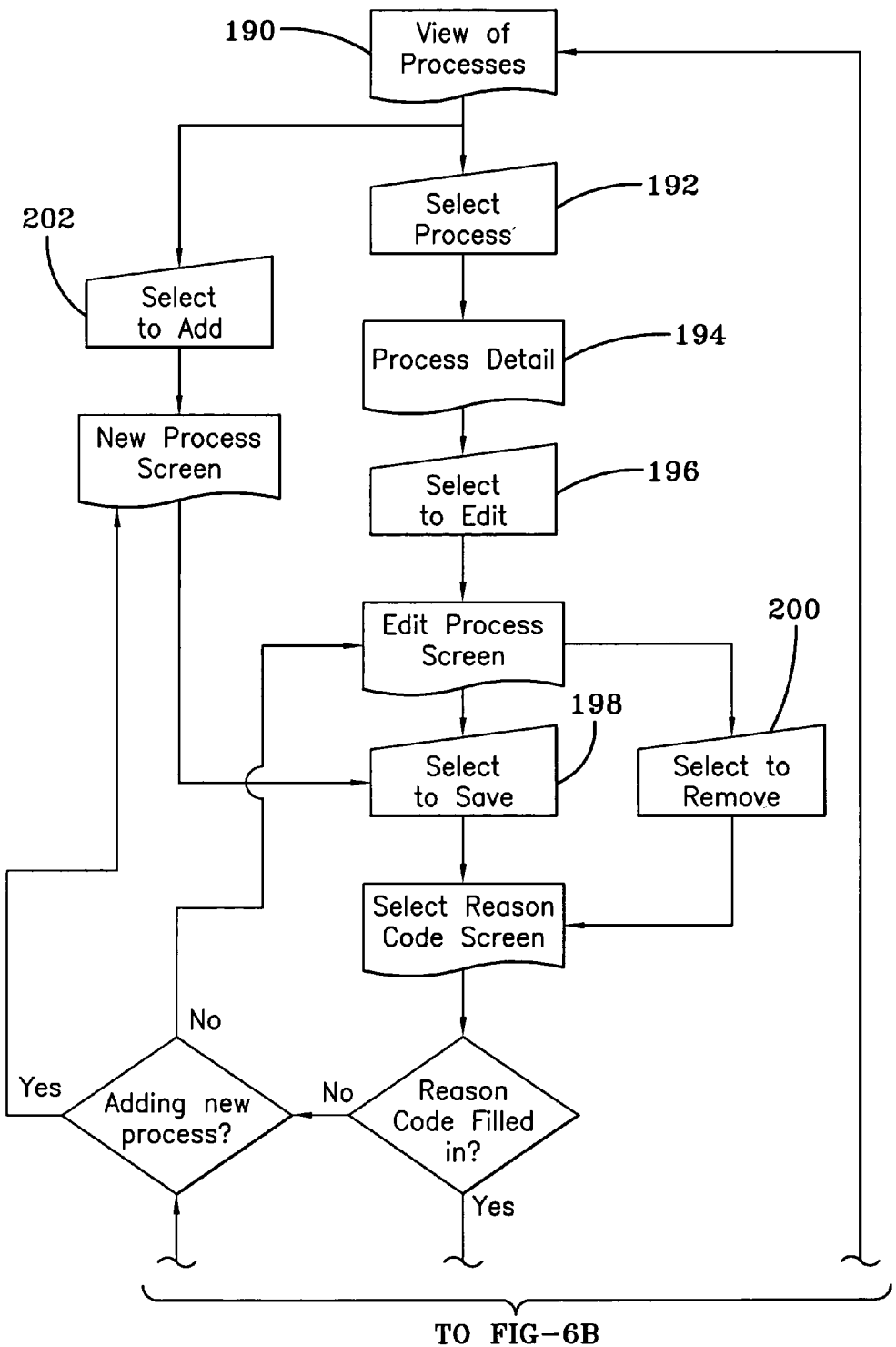
FIGS. 6A-6B are a process flow diagram for a process management module in accordance with an example embodiment of the present invention.
Figure 6B:
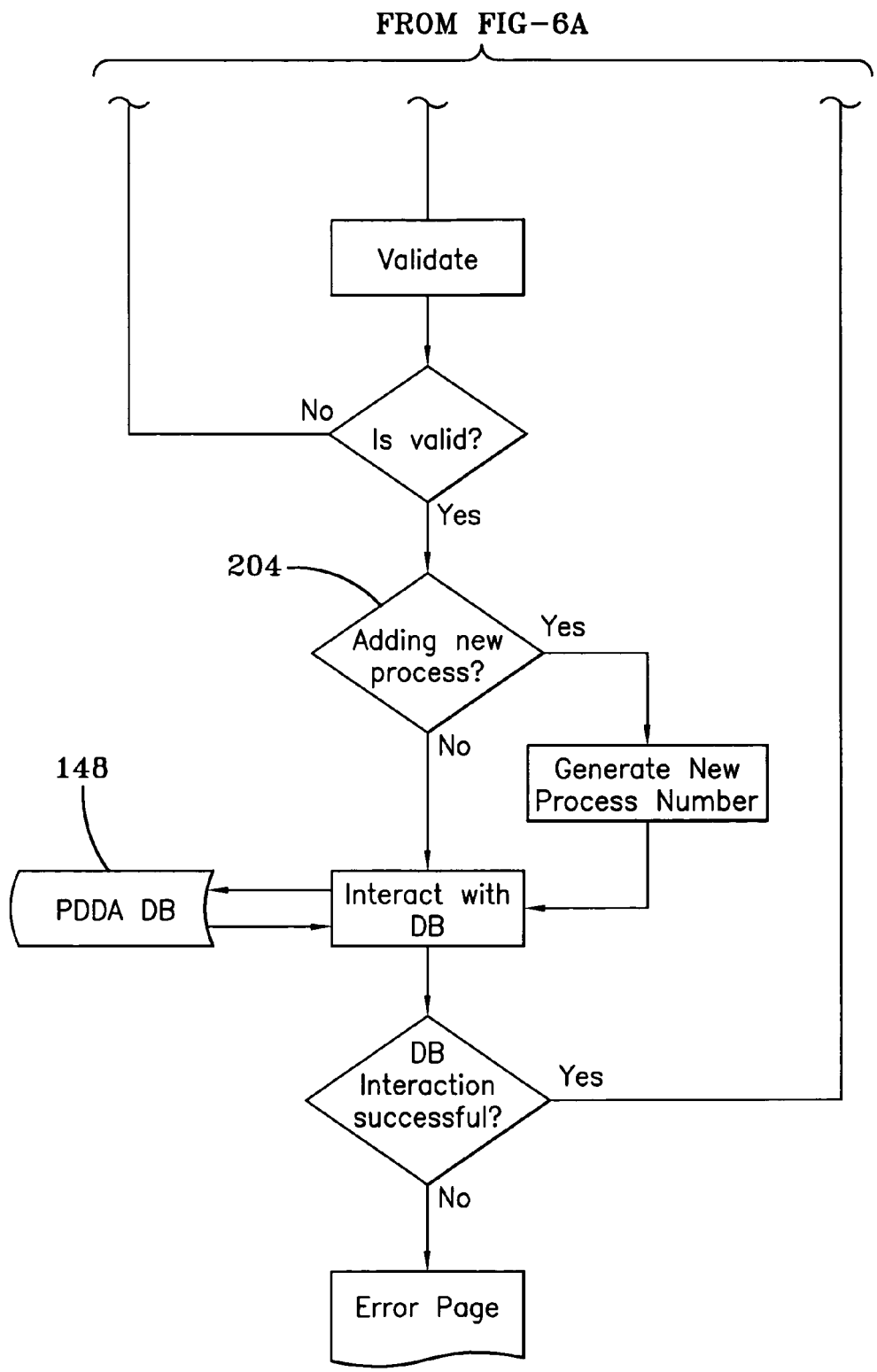

Referring to FIGS. 6A and 6B, a process management flow diagram for an example embodiment of the present invention is shown. As indicated, a user may view processes 190, select a process 192, view process details 194, and edit 196, save 198, or remove 200. In addition, a user may add new processes 202. New process numbers may be generated automatically as they are added 204. As the user completes tasks related to the definition and maintenance of processes, the process management module interacts with the PDDA database 148. The PDDA database 148 may comprise process management data such as process numbers, process names, product (body) locations, process descriptions, and features.

Unit Management

Each process that may be defined comprises a plurality of units (units of operation). Each unit (unit of operation) may further comprise working point details that explain the tasks associated with the unit. Various unit management features and functions allow a user to define and maintain units. In an example embodiment of the present invention for automobile manufacturing, a user specifies model year, production rate, production line, and vehicle model code before entering the unit management module of the application. The system may remember a user's prior selections. Drop-down menus are populated from the administration section of the application. Each drop-down menu may list data in ascending order. Once the user has specified a model year, each drop-down thereafter is populated based on the previous drop-down selection. In unit management, the user has the ability to:

Get Unit—If the user knows the unit number, a "Get Unit" function may be used to retrieve the unit by number. The user is taken to the view unit screen of FIGS. 7A, 7B and 7C.

View Unit—in the view unit screen of FIGS. 7A, 7B and 7C detailed information regarding the specified unit is presented. Referring to FIG. 7A, the user may edit or delete the unit 226, or add/update images to the unit sheet 212. The images show details regarding installation of the component on the production line. This screen also provides options to view and print unit sheet reports 214. Referring to FIGS. 7B and 7C, the user also has options to view unit time reports 228 and process/part summary reports 230.

Edit Unit 226 (FIG. 7A)—selecting the "Edit" option takes the user to an editable screen where detailed unit information, parts data, and model type associations may be changed.

Delete Unit 226 (FIG. 6A)—selecting the "Delete" option removes the unit from the system.

The view unit screen of FIGS. 7A, 7B and 7C allow the user to view details about a specific unit. The details are laid out in five sections. They include:

Header Information Section 210 (FIG. 7A)

Team—this field identifies a group of associates who perform the functions (units) within the process. The character field (e.g., four characters) is automatically populated based on the process number.

Zone—this field identifies a specific section of the production or assembly line where the process is performed. The character field (e.g., two characters) is automatically populated based on the process number. The zones in the list box are associated with the model year, production rate, line, and vehicle model code previously chosen by the user.

Sub-zone—this field identifies a specific section of the assembly line where the process is being performed. The character field (e.g., three characters) is automatically populated based on the process number. The sub-zones in the list box have an established relationship with the zone chosen by the user.

Unit of Operation—this field is a description of the work to be performed. It is an open text field that allows a description of up to 254 characters. For example, the unit of operation description may be "Set runchannel to top section of right front door sash."

Unit Information Section 216 (FIG. 7A)

Base Part #—this field is a portion of the digits (e.g., first five digits) of a part number. In an example embodiment of the present invention, it may accept five digits for current model information and up to five characters for new model information.

Work Area—this field identifies a specific location on the manufactured product (e.g., automobile) where work is performed.

Torque Value—this field shows the torque value which is a predetermined tightness of a specific function as determined by drawings associated with the part to be installed. There are four options from which to choose:

Range—Has two fields (MIN=Minimum value; MAX=Maximum value)

Preset—Has one field

NLC—No Loose Condition

None is the default field

Auxiliary Materials—this field identifies supplemental material used on certain units as specified by a quality group.

Quality Issues—this field identifies a unique quality identifier established by a quality group. The user may select one or many identifiers to add appropriate descriptions to the unit information.

Working Point Detail—this field includes detailed steps on how to perform a unit of operation. It may be populated from the unit time section.

Working Point—this field is used to relay detailed information on how to perform a unit of operation if not captured in the working point detail section.

Quality Point—this field includes specific quality instructions to be used while performing the unit of operation.

Unit Time Section 218 (FIG. 7A)

Sequence Number—this field identifies the sequence number for the unit.

Working Point Detail—this field includes the detailed steps for a unit of operation.

Time Sequences—these alpha/numeric values are used to establish time based on motions required to perform associated working point detail. These sequences may be manually entered or selected from the list box. Manually entered sequences consist of all letters and values of a valid sequence. Sequences may contain parentheses to reflect a grouping to be multiplied by a frequency. Values outside of the parentheses are multiplied by a frequency value of one. Data related to time sequences may be obtained from the users, may be predetermined sequences, or may be obtained from the MOST system.

Listed sequences consist of eight options:

General Move—pre-populated letters that require a valid value. Value may be zero.

Controlled Move—pre-populated letters that require a valid value. Value may be zero.

Tool Usage with "A"—pre-populated letters that require a valid value. Value may be zero.

Tool Usage—pre-populated letters that require a valid value. Value may be zero.

Manual Crane—pre-populated letters that require a valid value. Value may be zero.

Special Operation—requires a time management unit (TMU) or second value to be entered.

Machine Operation—requires a time management unit (TMU) or second value to be entered.

Common Sequence—lists multi-lined sequences that have been predetermined. Upon choosing a common sequence from the list, the unit time section is populated with the predetermined information. If data needs to be edited once the unit time section is populated, the user may follow normal editing procedures. If a common sequence contains a question mark, the user may edit that line and insert the correct value.

Frequency (Freq)—this field is a numeric field that is used to set a multiplier. Once the time sequence is determined, the user may multiply it by a number or fractional value by using the frequency field. If parentheses are used, the grouping inside the parentheses is multiplied by the frequency with all other values multiplied by one. The default value is one.

Internal to Sequence (Int to Seq)—this field is used to show work that is being performed simultaneously with other work. The user may enter a valid line number of the simultaneous step. No time value is shown when this option is used. The default for this field is zero.

Net/Loss Code—this code indicates whether an item is value or non-value added. The user may manually enter the data or choose it from a list box.

Time (seconds)—this field shows the amount of time in seconds it takes to perform a specific sequence by converting the TMU's to seconds. The multiplier used for the conversion is TMU value X.036X Frequency. This field may be automatically populated.

Base Part #—this field is used to assign a specific time to a part number. This field may be automatically populated from the base part number in the unit information section and changes whenever an edit is made to that section. The user may choose to edit the base part number in the unit time section. If the base part number is edited at the unit time level, the link to the unit information section is removed and all edits to that specific line may be completed manually at the unit time level.

Unit Parts Section 220 (FIG. 7C)

Part No.—this field identifies a specific part. Selecting a specific part allows a user to edit unit part data. In the process/parts summary of the unit parts module, upon entering a valid part number and exiting the field, the list option for a parts database lookup is activated. The list (e.g., data from a parts database) shows valid part numbers with the option to select a specific date driven section and item. The user may select an option beside the information to be populated on the part screen.

The user may then be asked to "Update Model Matrix." If "yes" is selected, the model types associated with the section, item, and date selected are populated on the screen in the unit matrix section after a submit option is selected. If "No" is selected, the section, item, and date are populated on the unit screen with no matrix information after a submit option is selected.

Part Name—this field identifies the name that is assigned to a part. This field is automatically populated from a parts database for valid parts.

Quantity (Qty)—this field identifies the number of parts.

Delivery Style (Del Style)—this field identifies the method of part delivery.

Delivery Zone (Del Zone)—this field identifies the zone from which the part will be coming.

Delivery Location (Del Location)—this field identifies a specific location to which the part is to be delivered.

Section No.—this field identifies the part category.

Item No.—this field identifies a parent part that may be required for installation of the primary part.

Delivery Effective Date—this date field (e.g., mm/dd/yyyy) indicates when the part should be available for use in the installation process. The date field may be automatically populated based on the date entered. This date is used to aid delivery changes.

Part Database Begin Date—this date field (e.g., mm/dd/yyyy) indicates when the part should be available for use in the installation process. The date field may be automatically populated based on the selection of a section/item from a parts database list. This date is used to establish a link to a model matrix.

Unit Matrix Section 222 (FIG. 7B)

The "Unit Matrix" section shows the models and model types to which the unit of operation applies. In other words, the unit of operation may be performed on the models and model types shown in the matrix. The models are listed separately and have corresponding model types listed below. Model types may be manually entered or populated from a parts database when adding a part.

Unit Time Report 228 (FIG. 7B)—selecting the "Unit Time Report" option allows the user to see a print preview of a unit time report. A unit time report contains detailed unit time information. This report may also be generated for multiple processes from the "Generate Reports" module of the application.

Process/Part Summary 230—selecting the "Process/Part Summary" option allows the user to see a print preview of the process/part summary. The process/part summary contains process, unit, and detailed part information. This report may also be generated for multiple processes from the "Generate Reports" section of the application.

View Unassigned Units—the user may view all units that are currently not assigned to a process by selecting a "View Unassigned Units" option from a unit management main menu. The units are listed in ascending numerical order. The display includes the following information:

Unit Number
Unit of Operation
Reason Code—the most recent reason code entered for the unit. Reason codes are captured when adding, editing, or deleting a unit and relate to reasons that a unit may be added, edited, or deleted (e.g., unit no longer needed for process, task for unit changed, etc.)

View Units w/No Images Assigned—the user may view all units that currently do not have assigned images by selecting the "View Units w/ No Images" option from a unit management main menu. The units are listed in ascending numerical order and displayed by team and process number. The display includes the following information:

Team
Process Number
Process Name
Unit Number
Unit of Operation
Create Date—this field is the calendar date the unit was originally created.

Share Unit—the user may share unit detail data with another process on a different production line by selecting the "Share Unit" option from a unit management main menu. The user may perform the following steps.

Step 1: Specify the unit to share—the user enters a unit number in a text box adjacent to the unit number prompt. When the user exits the field, the system automatically verifies the unit number and enters the process number if the unit is valid.

Step 2: Specify the process number to which the unit will also be assigned—the user enters a process number with which to share the unit. The system validates the entered process number prior to the sharing the unit. Selecting a "Create" option shares the unit with the new process.

Add/Update Images 212 (FIG. 7A)—an "Add/Update Image" section allows the user to attach or assign images or diagrams to the unit. The attached images appear on unit sheets in the order they are uploaded to the application. Unit sheets are installation instructions and images/diagrams that may be used by associates on the production line to learn and understand a unit of operation.

Add Images—the user selects a "Browse" option in the respective area and navigates to the location where the images/diagrams are stored.

View Images—the user selects a "Browse" option in the respective area selects a file to view from the location where the images/diagrams are stored.

Remove Images/Diagrams—the user selects a "Browse" option in the respective area selects a file to delete from the location where the images/diagrams are stored.

Menu—Parts Lookup—this feature allows the user to retrieve part information from the various databases (e.g., the PDDA database or other parts database). Selecting a "Parts Lookup" option takes the user to a parts lookup screen. The user may execute one of two types of part lookups.

Part Lookup—this feature allows the user to determine if a part is associated with a process and unit in the process data development and analysis application. The user may enter a part number or any portion of a part number and select a "Look up Part" option. The system returns a list of parts that match the search criteria entered. The search results are listed by part number by team and include part number, part name, quantity, team, process number, unit number, delivery style, delivery zone, delivery location, section, and item number.

PDDA/Parts Database Comparison—this feature allows the user to compare data from different databases (e.g., the PDDA database and a parts database by part number).

Matrix Mass Update—this feature allows the user to copy a model matrix from one unit to a different unit or units. The user may specify the following:

Unit to copy from—the user manually enters a unit number in an "Apply Model Matrix from Unit No." text box field. Once the user exits the text box field, the system automatically verifies that the unit number is valid.

Unit to copy to—the user manually enters a unit number in a "To the following Units:" text box and then selects "Add" option. The system verifies that the unit number is valid. The user selects the "Add" option again. If the unit number is valid, the unit number in a text box under the "Units to Update" section is populated.

Remove a Unit—the user may remove a unit number from a "Units to Update" section by selecting the unit number in the list. The system highlights the unit number. Selecting the "Remove" option causes the system to remove the selected Unit number from the list.

By selecting an "Execute Mass Update" option, the system takes the model matrix assigned to the unit number entered in the "Apply Model Matrix from Unit No" text box and applies it to all unit numbers listed in the box below the "Units to Update" section.

Copy Unit—this feature allows the user to copy detailed unit level data from one unit to another unit or to a new unit. Selecting a "Copy Unit" option takes the user to a copy unit screen. The user may copy detailed unit data to a new or existing unit. The following Unit details are copied over:

Unit of Operation
Unit Information Section
Unit Time Section
Unit Part Section
Unit Matrix Step 1: Select the "Copy From . . . " criteria—in the "Copy all data from Unit Number" field, the user may enter a unit number. Once the field is exited, the system validates the unit number.

Step 2: Choose from one of the two options—the user may opt to copy the detailed unit information from the unit entered above to an existing unit or the user may create a new unit with the same attributes.

Copy to Existing Unit Number—in the "Copy to Existing Unit Number" field, the user enters a unit number. Once the field is exited, the system validates the unit number. Selecting the "Copy" option takes the user to an editable version of the unit selected. The user may save the unit in order for the system to capture the changes.

Copy to New Unit Number—selecting the "Create New Unit and Copy" option takes the user to the unit add form where all detailed information, as listed above, from the "Copy from . . . " Unit is populated. This information includes the process number, process name, team, zone, and sub-zone. The user may "Save" the unit in order for the system to capture the changes.

Figure 8A:
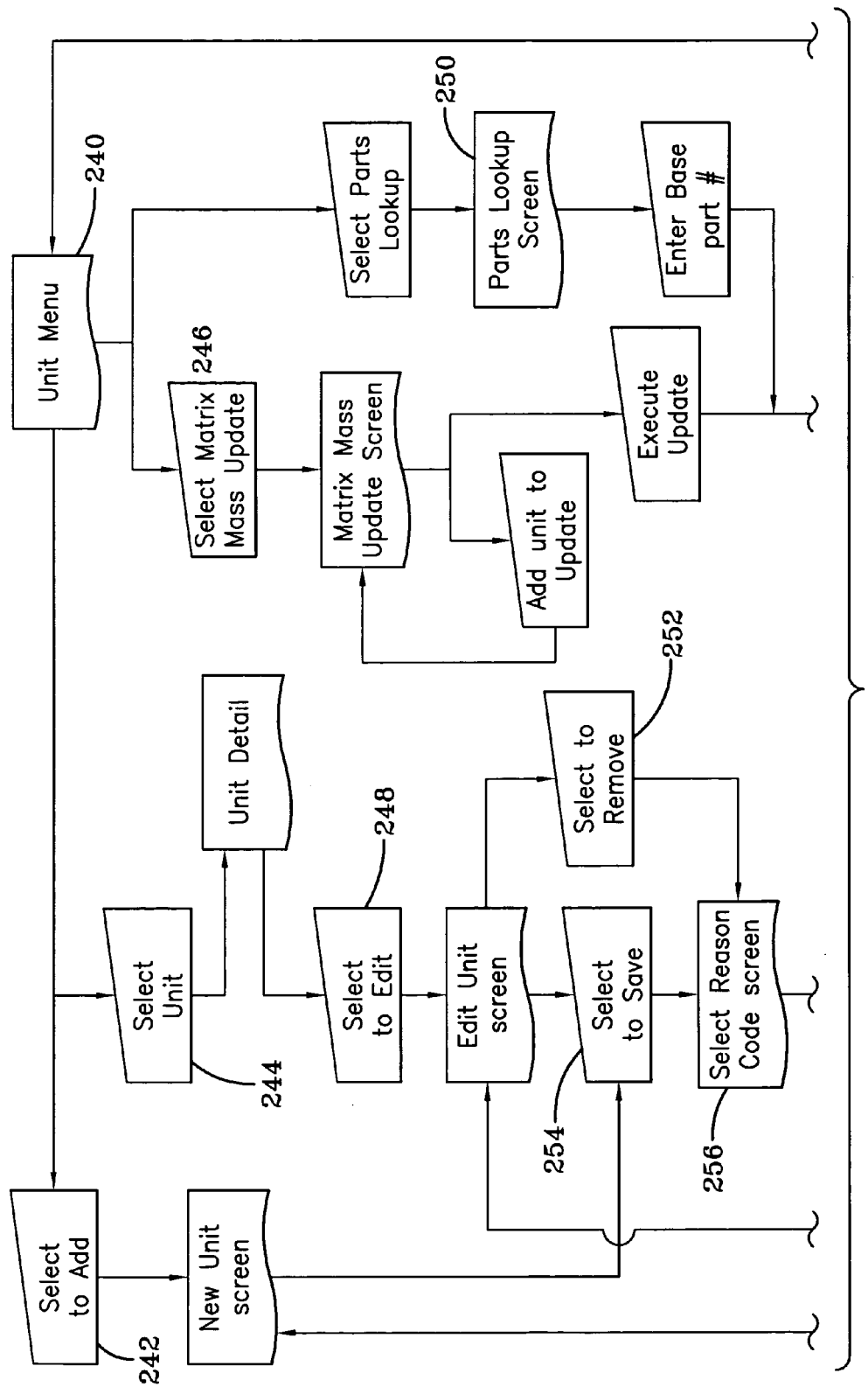
FIGS. 8A-8B are a process flow diagram for a unit management module in accordance with an example embodiment of the present invention.
Figure 8B:
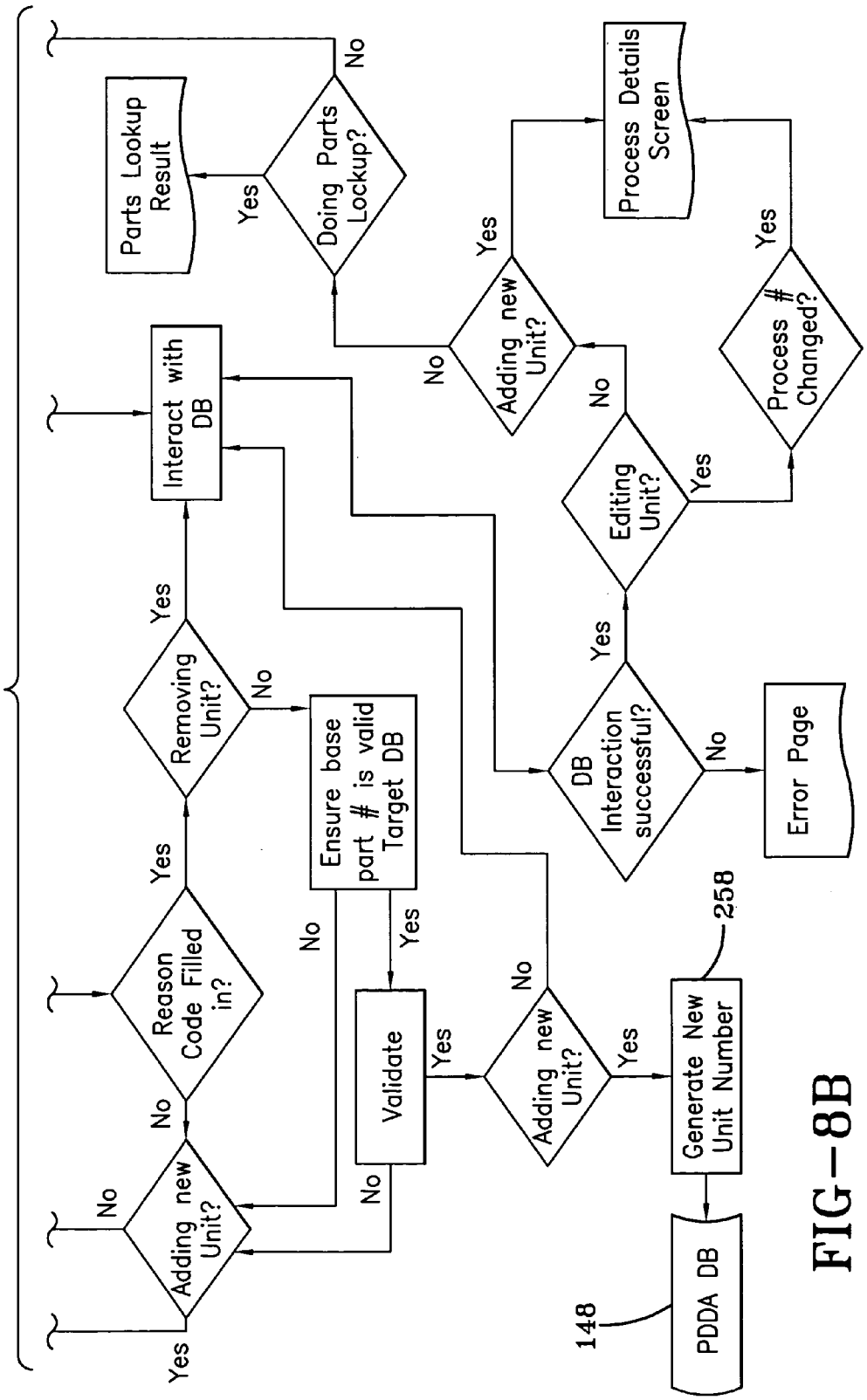

Referring to FIGS. 8A and 8B, a unit management flow diagram for an example embodiment of the present invention is shown. From a unit management module main menu 240, a user may add a unit 242. When a user adds a new unit, a new unit number is generated automatically 258. In addition, a user may select a unit to view 244, perform a matrix mass update 246, edit a unit 248, perform a parts lookup 250, remove a unit 252, or save a unit 254. When a user selects the remove 252 or save 254 option, the user may provide a reason code 256 that indicates why the unit has been added or deleted. Reason codes assist the manufacturer in determining why changes to production processes and units have been made. Completion of various tasks using the unit management module may require interactions with the PDDA database 148. The PDDA database 148 may contain unit management data such as unit numbers, unit of operation descriptions, base part numbers, work area data, torque values, auxiliary materials, quality issues, working point details, working points, quality points, and unit time data.

Manpower Scenarios

Figure 9:
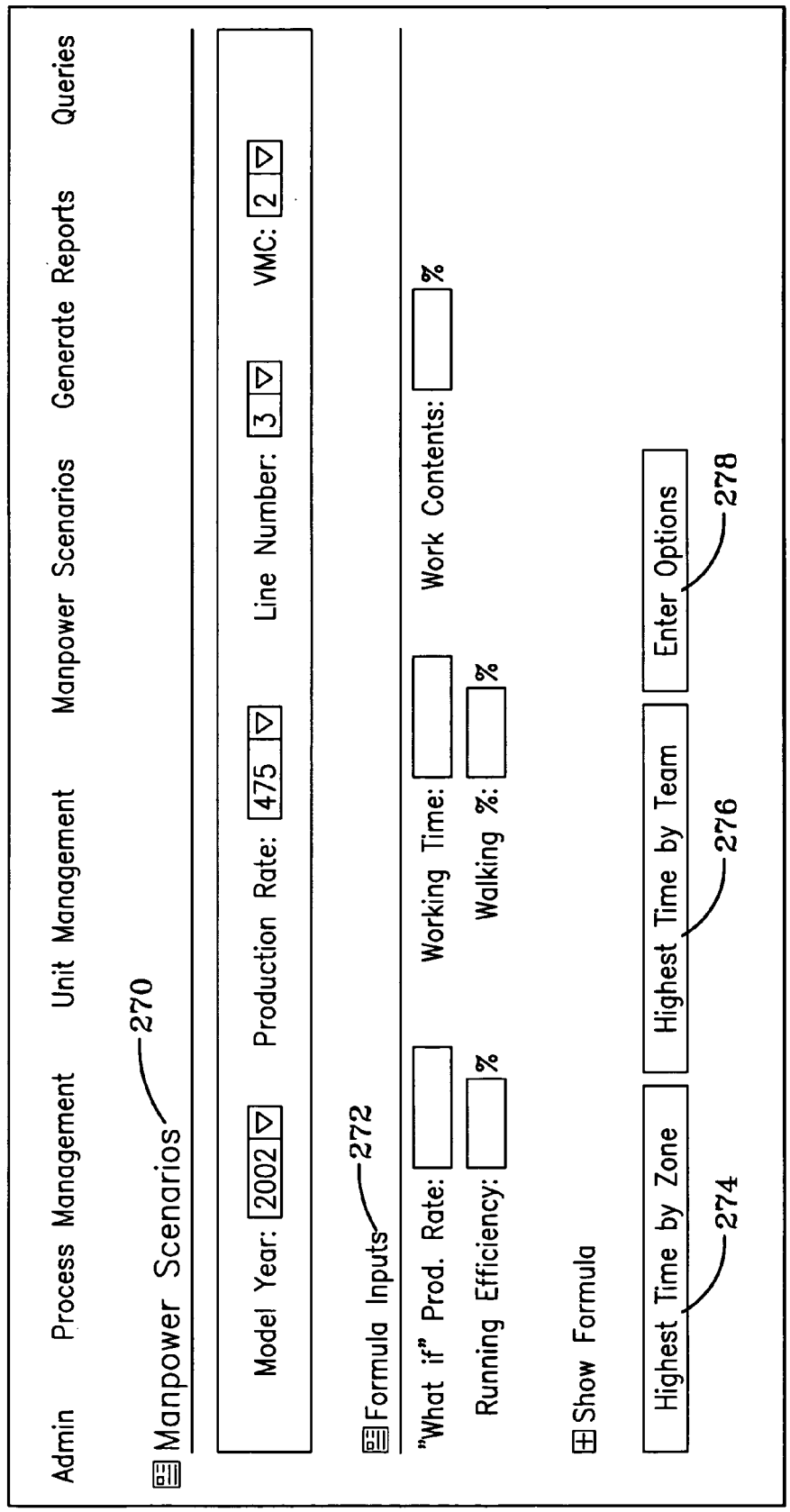
FIG. 9 is a manpower scenarios screen for an example embodiment of the present invention.

With the manpower scenarios module, the user has the ability to generate the following reports:

Manpower Spreadsheet by Highest Time
Manpower Spreadsheet by Model Type
Process Time by Model Type
Process Time—Highest
Process Time—Lowest
Process Time by Feature Referring to FIG. 9, a manpower scenarios screen for an example embodiment of the present invention is shown. The user specifies the model year, production rate, line number, and vehicle model code (VMC) 270. The system may retrieve the user's selections from the last log in so the user may not be required to enter the information.

The drop-down menus for the model year, production rate, line number, and vehicle model code 270 are populated from the administration section of the application. Each drop-down menu lists data in ascending order. There is a hierarchical relationship between the data items. Once the user has selected a model year, the available production rates for that year are shown. Once model year and production rates are selected, then line number and vehicle model code fields are populated based on the associations created and maintained through the administration module.

The user also has the option of entering formula inputs 272 to look at report results for different scenarios based on different production rates, working times, working contents, running efficiencies, and walking values. The user may check the calculation formula used to create results for a report by selecting the plus sign (+) preceding the "Show Formula" box 274. Selecting it again closes the formula box 274. Formula inputs may be specified as follows:

"What if" Production Rate—an optional value. If no value is entered, the calculation affects the process target time. Blanks, spaces, and whole numbers are valid entries. The remaining fields are used for the calculation. Whole numbers are valid entries.

Working Time—total seconds in a workday

Work Contents—the percentage of work able to be performed within a workday taking into account fatigue. This field accepts a value from 0-100%.

Running Efficiency—the percentage of time the production line is running in a workday. This field accepts a value from 0-100%.

Walking %—the percentage of time that is allotted for the act of physically walking. This field accepts a value from 0-100%.

After entering the variables, selecting the "Highest Time by Zone" option 274 or "Highest Time by Team" option 276 starts the report generation. The system creates a comma separated values (CSV) file that may be opened directly into a spreadsheet or saved to a target drive. This report is global and contains results for all models, zones, and sub-zones within the specified parameters.

If the user wants to focus the report results or generate more specific scenarios, selecting an "Enter Options" option 278 allows the user to narrow the report results for the Manpower Scenarios by Highest Time reports, or to create other reports.

Figure 10:
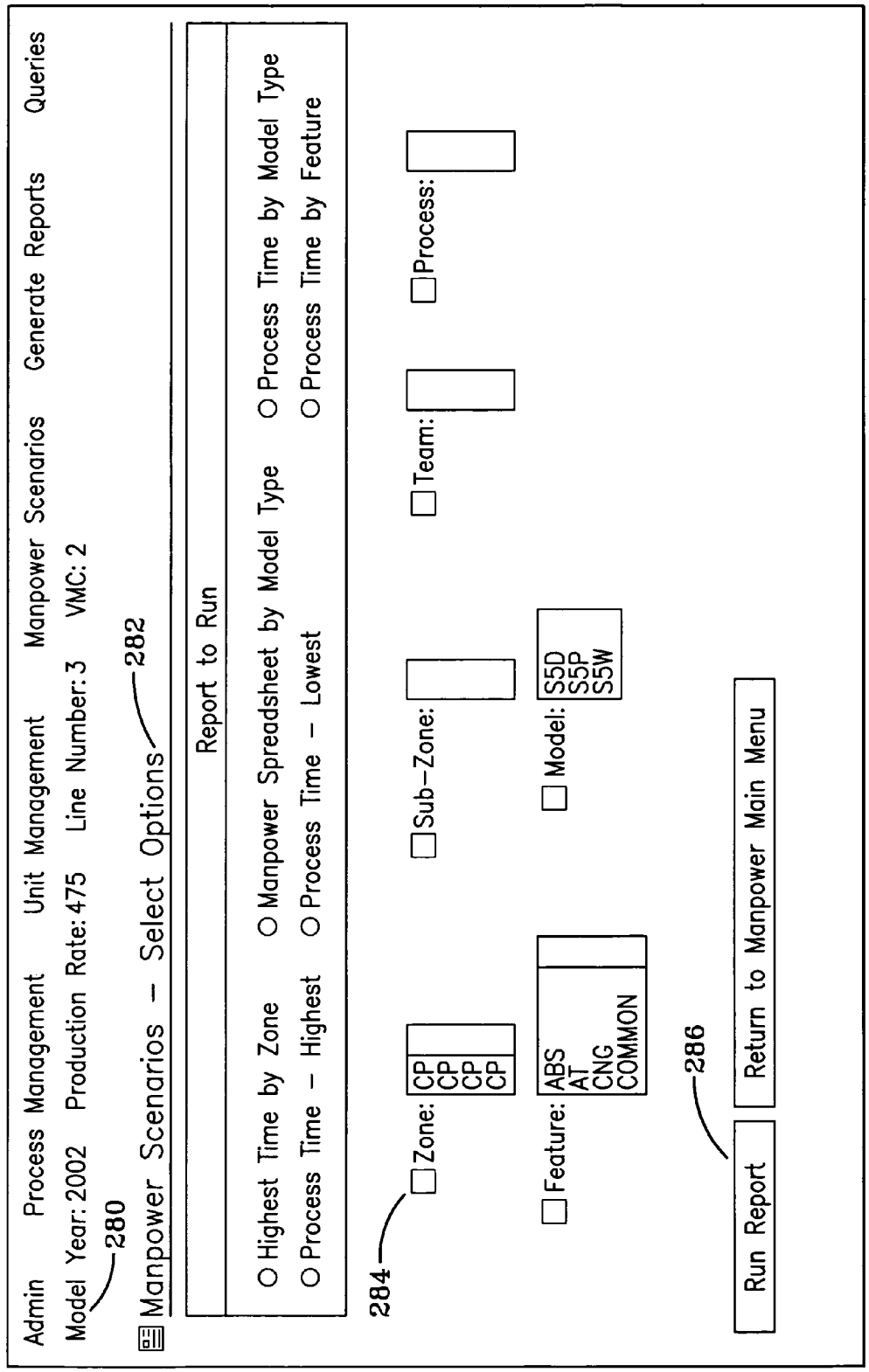
FIG. 10 is a manpower scenarios—select options screen for an example embodiment of the present invention.

Referring to FIG. 10, a manpower scenarios—select options screen for an example embodiment of the present invention is shown. The applicable model year, production rate, line number, and vehicle model code are displayed at the top of the screen 280. The following reports may be generated 282:

Highest Time by Zone
Process Time—Highest

Manpower Spreadsheet by Model Type
Process Time—Lowest
Process Time by Model Type
Process Time by Feature Selecting a Report—the user may select a report option from the select options box 282. Depending on which report is selected, the user is presented with variables to specify 284. They include zone, sub-zone, team, process, feature, and model.

Selecting Variables—most variables are optional, but some may be required. The user may make the report general or specific by the variables he or she selects. If no optional variables are specified, then the report includes all possible variables for the specified parameters. Selecting variables limits the report to those choices.

Checking Variables Selections—to check selections within a variable, the user may select an icon next to the variable name. Selections are displayed above the variables.

Running the Report—the user may select the "Run Report" option 286 after choosing a report and selecting variables.

Generate Reports

The generate reports module of the application allows the user to generate standardized reports. Referring to FIG. 11, a generate reports screen for an example embodiment of the present invention is shown. Each report has specific criteria that the user selects to further clarify the desired results. In most cases, the reports may be generated for multiple teams, processes, and units.

Operations Standards Reports 290

Change History—this report captures all changes by date that were made to the unit.

Line Layout—this report presents a visual representation of the line by body location and process.

Parts End Dated in Part Database—this report lists all parts that no longer exist in the parts database, but are associated with a unit.

Process Change Form—this report captures all changes to a unit by date. The ability to generate a manual change form, reprint an existing change form, and identify changes where a process change form has not been printed is also available.

Process/Parts Summary—this report captures all parts associated with a process at the Unit level.

Process Sheets—this report captures process detail information at the unit level.

Unit Sheets—this report captures images associated with a unit and specific unit information.

Unit Time Sheets—this report captures detailed unit time sequence information, including frequency, internal to step, and sequence string.

Manpower Justification Reports 292—the output of these reports is exported into a comma separated value file that may be opened in a spreadsheet or saved to a file.

Change Point Document—this report contains detailed information and diagrams of changes by event.

Manpower Process ID by Team—this report lists all processes by model type and model features selected.

Monthly Time Tracking—this report lists a summation by month of unit time by sub-zone or net and loss codes.

ST by Model Types—this report lists a summation by model/model type option of total times for assigned units.

ST by Base Part Number—this report shows net/loss time at a base part number level.

Unit Time Tracking—this report shows the time changes at the unit level.

SAR Reports 294 is a view only list that shows the user what reports have data related to parts that are used in process and unit definitions. Associates who define process and units require access to current part status information and to current part delivery so that processes and units correspond to the parts that will be used during production. Changes in part status information and part delivery information may require changes to processes and units that the associates define.

Figure 12:
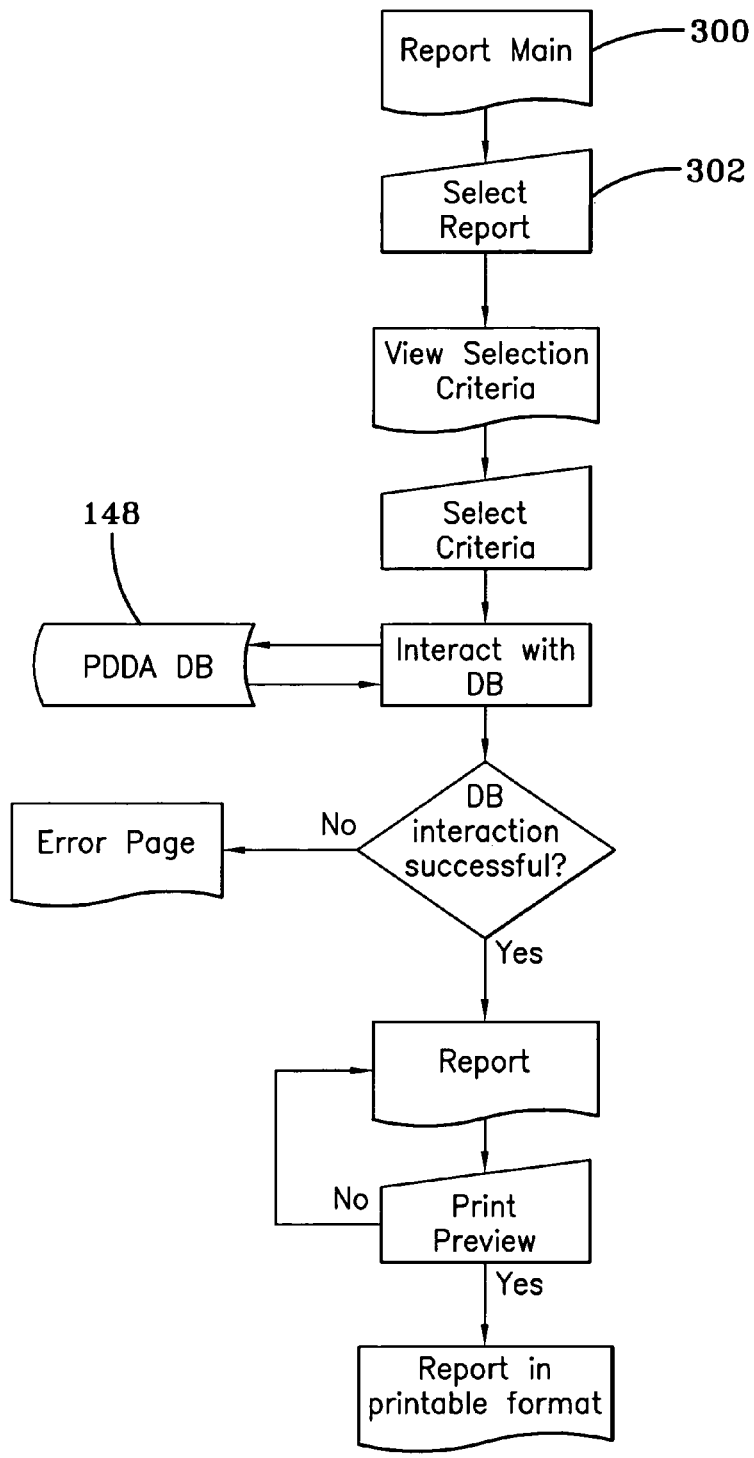
FIG. 12 is a process flow diagram for a generate reports module in accordance with an example embodiment of the present invention.

Referring to FIG. 12, a generate reports flow diagram for an example embodiment of the present invention is shown. A report main menu 300 lists the options available to the user. The user may then select a specific report to generate 302. Report generation tasks may require interaction with the PDDA database 148 to locate process data and unit data as well as other data for the reports.

Queries

A queries module allows the user to execute queries to extract data from the PDDA database based on criteria set by the user. A user may choose to execute queries to obtain data that is not provided in standard reports. A set of standard queries may be provided to the user so that the user is not required to re-enter selection criteria. Referring to FIG. 13, a standard queries screen for an example embodiment of the present invention is shown. The user may select from the queries displayed on the screen. The format of the query names 310 may be P_DD_NN where P refers to a plant, DD refers to a department, and NN refers to the query number. A comments column 312 provides a brief description of the query.

Referring to FIG. 14, a substitution variable values screen for an example embodiment of the present invention is shown. A user may change the values of various parameters used in the standard queries. For example, the user may change the model year, production rate, line number, vehicle model code, or part number.

The present invention supports process data development and analysis for a manufacturing concern. A web-based application allows a user to access data from various information sources to define and manage processes. Each process may comprise a set of units of operations that relate to installation of a component on a manufactured product. Each unit of operation may have associated with it a time for completion. The process, unit of operation, and timing data allow a manufacturer to review and analyze the amount of time required to perform processes on a production line that result in a manufactured product.

While example embodiments of the invention have been illustrated and described, various modifications and combinations can be made without departing from the spirit and scope of the invention. For example, the features and functionality of the present invention may provided using fewer software modules or more software modules than described in accordance with an example embodiment of the present invention. Although the present invention has been described in relation to automobile manufacturing, the disclosed process data development and analysis system and may be used in any manufacturing environment for any type of manufactured product. Modifications, combinations, and equivalents to the system and method of the present invention are intended to be covered and claimed.

What is claimed is:

1. A computerized method for data development for a plurality of processes for associates on a production line to perform to install parts on manufactured products comprising the steps of:
   (a) interacting with a software application operating on a computer to develop data for a plurality of processes by:
      (i) defining a plurality of processes, each of said plurality of processes comprising a process number and a process name;

(ii) associating with each of said plurality of processes a plurality of units of operation, each of said units of operation comprising:
    (A) a unit sequence number;
    (B) a unit description;
    (C) a base part number;
    (D) a plurality of working point details related to installation of a part on a manufactured product; and
    (E) a unit time for each of said working point details;
(iii) associating with each of said plurality of processes a plurality of details, said details comprising:
    (A) a team identifying a group of associates that performs said units of operation;
    (B) a zone identifying a section on said manufactured product where said process is performed; and
    (C) a product location identifying a physical location on said manufactured product where said parts are installed by said group of associates; and
(iv) accessing a computerized parts database from said computer to obtain data regarding said parts to be installed on said manufactured product by said associates on said production line and associating said parts data with said plurality of processes and said units of operation;
(v) associating a first set of processes with a first manufactured product;
(vi) associating a second set of processes with a second manufactured product, said second set of processes different than said first set of processes; and
(b) saving in a computerized database data developed for each of said plurality of processes for associates on said production line to perform to install parts on said manufactured products.

2. The computerized method of claim 1 further comprising the step of:
  interacting with said software application to produce parts delivery information indicating where to deliver parts on said production line to assemble said manufactured products according to said processes.

3. The computerized method of claim 1 wherein associating a first set of processes with a first manufactured product comprises the step of:
  interacting with said software application to define which processes apply to said first manufactured product according to a combination of model year, model type, production rate, and production line.

4. The computerized method of claim 1 further comprising interacting with said software application to define for said units of operation details comprising work area, torque value, auxiliary materials, quality issues, working points, and quality points.

5. The computerized method of claim 4 further comprising interacting with said software application to define operation standards for use by said associates on said production line wherein said operation standards comprise a brief description of said process, a description of said units of operation that explains individual tasks to be performed by said associates to complete said process, descriptions of safety and quality issues involved in installation of a part on said manufactured product, and a description of problems that may be encountered when installing said part on said manufactured product.

6. The computerized method of claim 1 wherein said unit times are based on pre-determined data from a computerized database of sequences entered by a user.

7. The computerized method of claim 1 wherein said manufactured products are automobiles.

8. A computerized method for developing process data for associates on a production line to perform to install parts on a manufactured product comprising the steps of:
  (a) entering into a computerized database administration data, said administration data comprising user data, team data, manufactured product data comprising model year, production rate, production line, and model code data;
  (b) interacting with a software application operating on a computer to select from said computerized database manufactured product data comprising a model year, production rate, production line, and model code for a first manufactured product;
  (c) interacting with said software application to define a plurality of processes for associates on a production line to perform to install parts on said first manufactured product, each of said plurality of processes comprising a process number and a process name;
  (d) interacting with said software application to define a plurality of units of operation for each of said plurality of processes, each of said units of operation comprising:
    (i) a unit sequence number;
    (ii) a unit description;
    (iii) a base part number;
    (iv) a plurality of working point details related to installation of a part on said manufactured product;
    (v) a unit time for each of said working point details; and
  (e) interacting with said software application to associate with each of said plurality of processes a plurality of details, said details comprising:
    (i) a team identifying a group of associates that performs said units of operation;
    (ii) a zone identifying a section on said first manufactured product where said process is performed; and
    (iii) a product location identifying a physical location on said first manufactured product where said parts are installed;
  (f) associating said plurality of processes with said manufactured product data;
  (g) saving in said computerized database data for said process associated with said manufactured product data and data for said plurality of units of operation for said process.

9. The computerized method of claim 8 further comprising the steps of:
  (h) interacting with said software application operating on said computer to select from said computerized database manufactured product data comprising a model year, production rate, production line, and model code for a second manufactured product;
  (i) associating a plurality of processes with said manufactured product data for said second manufactured product; and
  (j) saving in said computerized database data for said processes associated with said manufactured product data for said second manufactured product.

10. The computerized method of claim 8 further comprising the step of:
  interacting with said software application to produce parts delivery information indicating where to deliver parts on said production line to assemble said manufactured products according to said processes.

11. The computerized method of claim 8 further comprising the step of:
    interacting with said software application to define for said units of operation details comprising work area, torque value, auxiliary materials, quality issues, working points, and quality points.

12. The computerized method of claim 8 further comprising the step of:
    interacting with said software application to define operation standards for use by said associates on said production line wherein said operation standards comprise a brief description of said process, a description of said units of operation that explains individual tasks to be performed by said associates to complete said process, descriptions of the safety and quality issues involved in installation of the part on said manufactured product, and a description of problems that may be encountered when installing the part on said manufactured product.

13. The computerized method of claim 8 further comprising:
    retrieving from said computerized database administration data, process data, and units of operation data by querying said database; and
    generating a report in accordance with said administration data, said process data, and said units of operation data.

14. The computerized method of claim 8 further comprising associating images with said units of operation.

15. A computerized method for developing process data to instruct associates on a production line to install parts on a manufactured product comprising the steps of:
    (a) defining a plurality of teams, each of said teams comprising a team sequence number and a plurality of associates;
    (b) defining a plurality of zones, each of said zones corresponding to an area on said production line where a process for installing a part on said manufactured product is performed;
    (c) defining a plurality of processes for associates of a team on a production line to perform to install parts on said manufactured product;
    (d) associating each of said plurality of processes with a model year, a production rate, and a model type for said manufactured product;
    (e) associating each of said plurality of processes with a team;
    (f) associating each of said plurality of processes with a zone;
    (g) determining a user's selection of a model year, a production rate, and a model type for said manufactured product;
    (h) determining a user's selection of process view according to team or zone; and
    (i) presenting to said user a view of processes for associates of a team on a production line to perform to install parts on said manufactured product related to said user's selections of model year, production rate, model type, and process view.

16. The computerized method of claim 15 further comprising the steps of:
    (j) determining a user's selection of a second model year, a second production rate, and a second model type;
    (k) determining a user's selection of process view according to team or zone; and
    (l) presenting to said user a view of processes for associates of a team on a production line to perform to install parts on said manufactured product related to said user's selections of said second model year, said second production rate, said second model type, and process view.

17. The computerized method of claim 15 further comprising generating parts delivery information indicating where to deliver parts to said production line to assemble said manufactured product according to said processes.

18. The computerized method of claim 15 further comprising generating from said processes operation standards for use by said associates on said production line.

19. The computerized method of claim 15 wherein said operation standards comprise a brief description of said process, a description of a units of operation that explains individual tasks to be performed by said associates to complete said process, descriptions of the safety and quality issues involved in installation of a part on said manufactured product, and a description of problems that may be encountered when installing the part on said manufactured product.

20. The computerized method of claim 15 wherein said description of a units of operation comprises:
    (i) a unit sequence number;
    (ii) a unit description;
    (iii) a base part number;
    (iv) a plurality of working point details related to installation of a part on said manufactured product;
    (v) a unit time for each of said working point details.

* * * * *

UNITED STATES PATENT AND TRADEMARK OFFICE
CERTIFICATE OF CORRECTION

| | | |
|---|---|---|
| PATENT NO. | : 7,664,780 B1 | Page 1 of 1 |
| APPLICATION NO. | : 11/345791 | |
| DATED | : February 16, 2010 | |
| INVENTOR(S) | : Beachy et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1051 days.

Signed and Sealed this

Thirtieth Day of November, 2010

David J. Kappos
*Director of the United States Patent and Trademark Office*